(12) United States Patent
Liu

(10) Patent No.: US 7,234,223 B2
(45) Date of Patent: Jun. 26, 2007

(54) METHOD FOR FORGING/MOLDING A COARSE BLANK OF AN ALUMINUM TRANSMISSION SHAFT

(75) Inventor: Chang Fa Liu, Taichung (TW)

(73) Assignee: Jinn Ruey Industries Co., Ltd., Taichung (TW)

( * ) Notice: Subject to any disclaimer, the term of this patent is extended or adjusted under 35 U.S.C. 154(b) by 473 days.

(21) Appl. No.: 10/899,486

(22) Filed: Jul. 26, 2004

(65) Prior Publication Data
US 2006/0016077 A1 Jan. 26, 2006

(51) Int. Cl.
  B23P 17/00 (2006.01)
  B21D 22/00 (2006.01)
  B21K 21/00 (2006.01)

(52) U.S. Cl. .................. 29/527.1; 72/352; 72/358; 72/372

(58) Field of Classification Search .......... 29/6.01, 29/888.08, 888.09, 527.1, 527.3; 164/464, 164/465, 476; 72/352, 358, 372
See application file for complete search history.

(56) References Cited

U.S. PATENT DOCUMENTS

| 5,105,644 | A | * | 4/1992 | Simon | 72/260 |
| 5,320,580 | A | * | 6/1994 | Simon | 464/183 |
| 6,959,476 | B2 | * | 11/2005 | Li et al. | 29/421.1 |
| 7,055,359 | B2 | * | 6/2006 | Liu | 72/356 |
| 2005/0086784 | A1 | * | 4/2005 | Li et al. | 29/421.1 |
| 2006/0016237 | A1 | * | 1/2006 | Liu | 72/356 |

* cited by examiner

Primary Examiner—Jermie E. Cozart

(57) ABSTRACT

A method for forging/molding a coarse blank of an aluminum transmission shaft, including steps of: placing burn-in softened aluminum material into a preheated mold; using a first punch head to first forge the aluminum material in the mold cavity from outer side of the molding hole so as to form a blank body of the transmission shaft with two pivot heads wherein one pivot head is located at each end of the transmission shaft and a shorter middle shaft rod; moving out the first punch head and connecting an extension mold with the mold; and immediately using a second punch head to secondarily forge the blank body in the mold cavity from outer side of the extension hole so as to make an end section of the second punch head extend into the mold cavity to a position near the inner end of the mold cavity, whereby the middle shaft rod of the blank body outward axially extends to the extension mold into a predetermined length to form the transmission shaft.

4 Claims, 4 Drawing Sheets

METHOD FOR FORGING/MOLDING A COARSE BLANK OF AN ALUMINUM TRANSMISSION SHAFT

BACKGROUND OF THE INVENTION

The present invention is related to a method for forging/molding a coarse blank of an aluminum transmission shaft. According to this method, burn-in softened aluminum material is first forged and molded into a blank body of the transmission shaft and then the blank body is continuously secondarily forged and molded into a coarse blank of the transmission shaft.

FIG. 5 shows an existent transmission shaft of a vehicle. The transmission shaft has a middle elongated shaft rod 81 and two pivot heads 92, 93 disposed at two ends of the shaft rod 81. The pivot heads serve as universal joints. In order to have a sufficient structural strength, the pivot heads have a size larger than the diameter of the middle shaft rod. Conventionally, the pivot heads and the shaft rod are separately manufactured and then the pivot heads are connected with two ends of the shaft rod by means of welding or fusion. According to such manufacturing procedure, the production efficiency is poor. Moreover, in order to have lightweight vehicle parts, the traditional transmission shaft is replaced with aluminum transmission shaft. For having sufficient strength of the middle shaft rod of the aluminum transmission shaft, the blank of the transmission shaft is first forged and then the blank is drilled into a hollow shaft rod. According to such measure, a great amount of aluminum material is wasted. Also, it is time-consuming to drill the blank of the transmission shaft. As a result, the manufacturing cost for the transmission shaft is high.

SUMMARY OF THE INVENTION

It is therefore a primary object of the present invention to provide a method for forging/molding a coarse blank of an aluminum transmission shaft. By means of a continuous forging operation, an aluminum transmission shaft with two pivot heads and a hollow middle shaft rod can be manufactured.

According to the above object, the method for forging/molding the coarse blank of the aluminum transmission shaft includes steps of:

(a) placing burn-in softened aluminum material into a preheated mold;
(b) using a first punch head to first forge the aluminum material in the mold cavity from outer side of the molding hole so as to form a blank body of the transmission shaft with two pivot heads at two ends and a shorter middle shaft rod;
(c) moving out the first punch head and connecting an extension mold with the mold; and
(d) immediately using a second punch head to secondarily forge the blank body in the mold cavity from outer side of the extension hole so as to make the middle shaft rod of the blank body outward axially extend into a predetermined length to form the transmission shaft.

The present invention can be best understood through the following description and accompanying drawings wherein:

DETAILED DESCRIPTION OF THE PREFERRED EMBODIMENT

Figure 1:
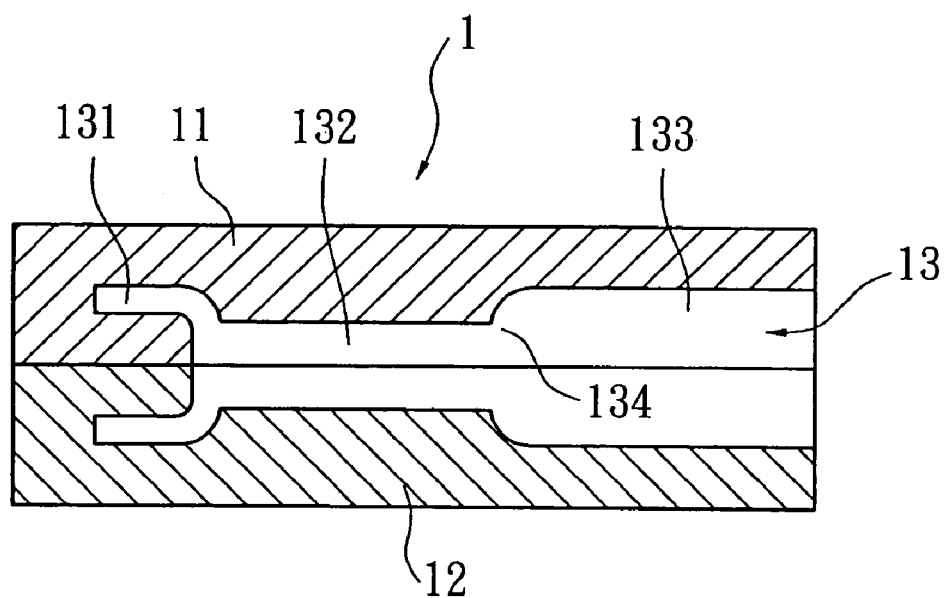
FIG. 1 is a plane sectional view of the mold of the present invention.
Figure 2:
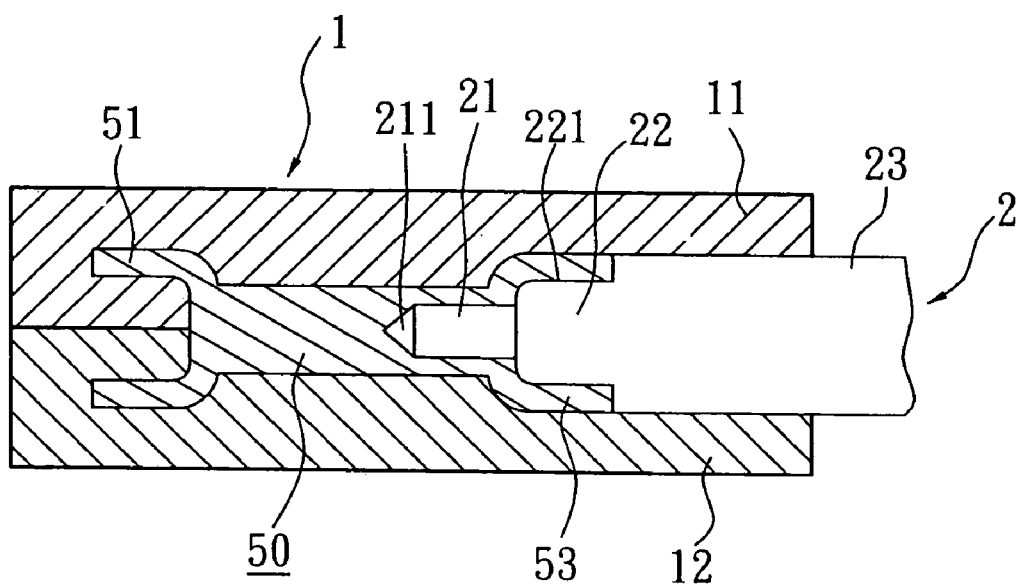
FIG. 2 is a plane sectional view showing that aluminum material is forged in the mold of the present invention to form a blank body of an aluminum transmission shaft.
Figure 3:
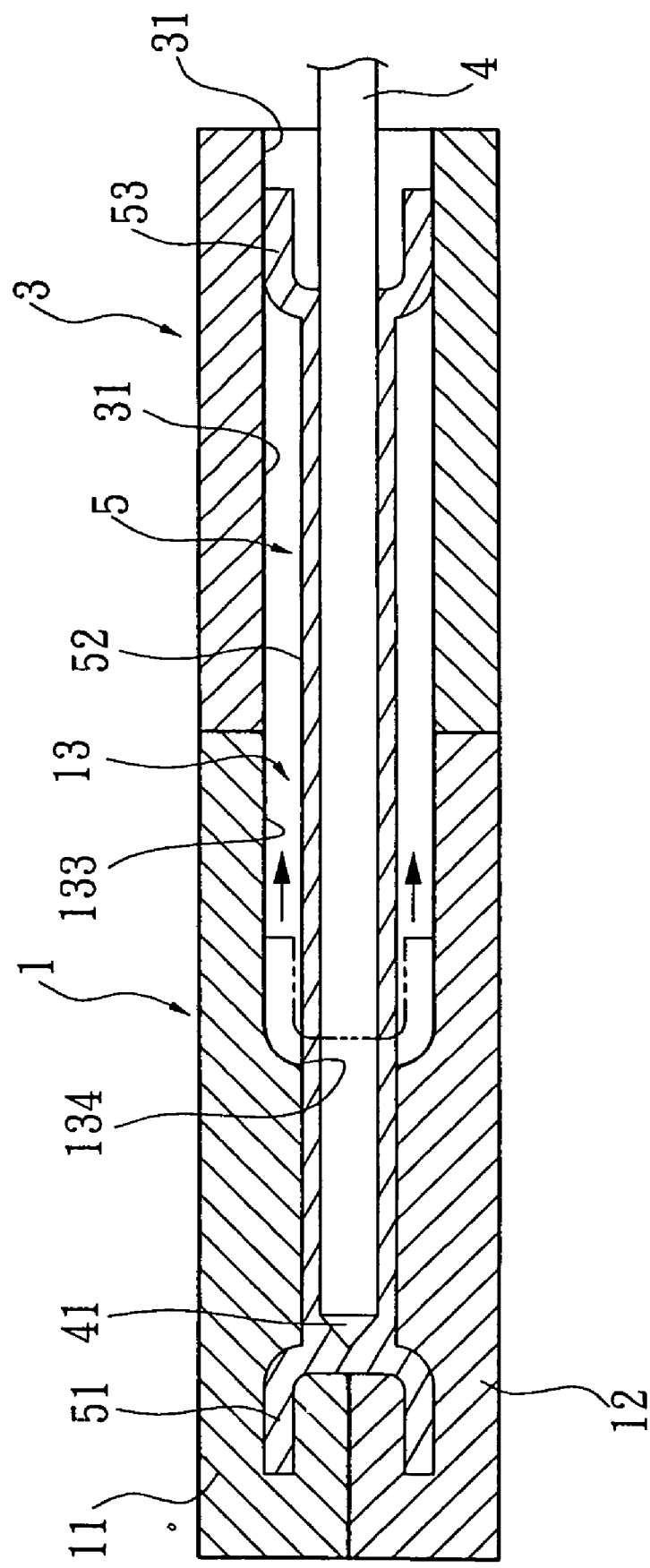
FIG. 3 is a plane sectional view showing that blank body of the transmission shaft is secondarily forged in the mold of the present invention.
Figure 4:
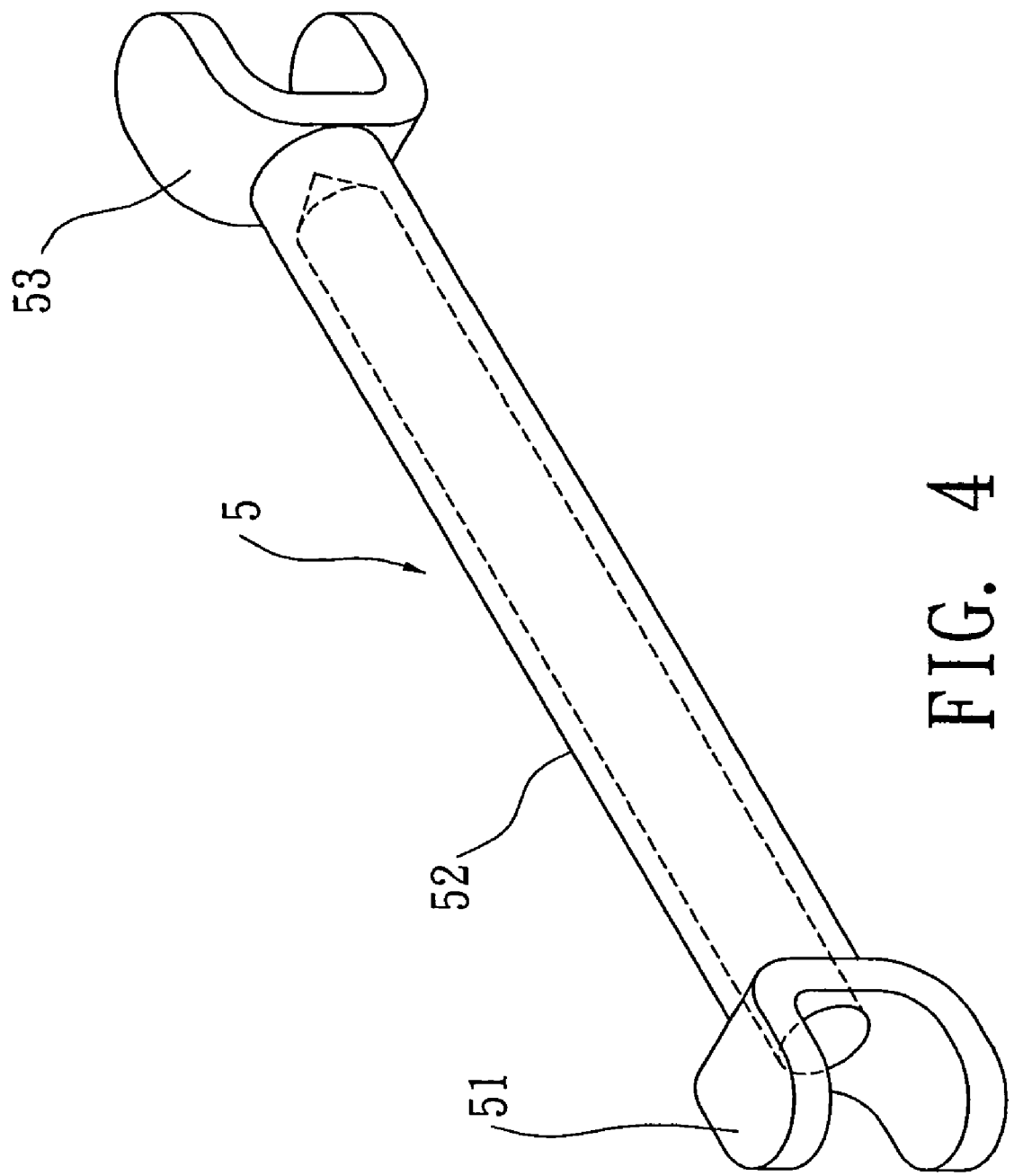
FIG. 4 is a perspective view of the completed coarse blank of the transmission shaft of the present invention.
Figure 5:
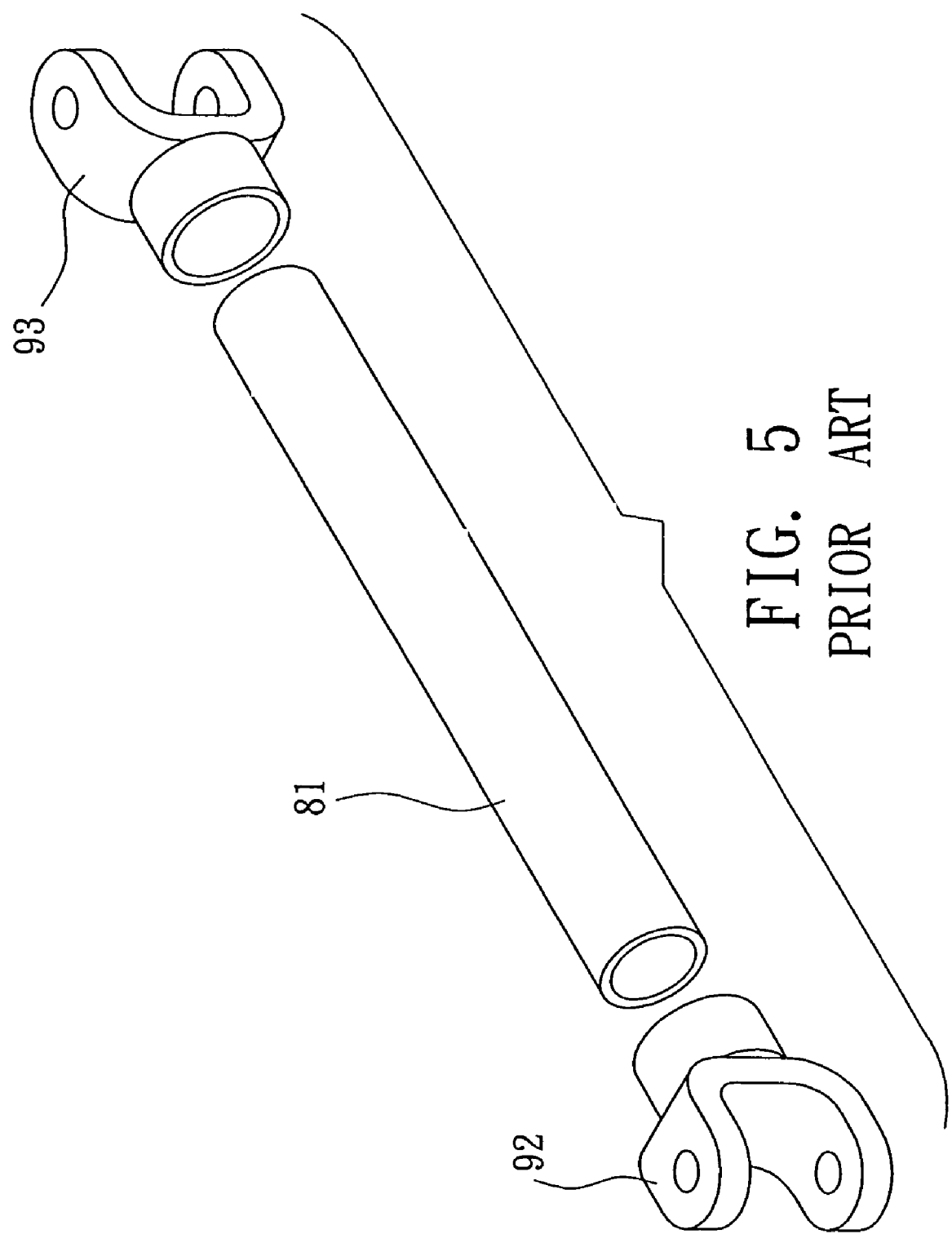
FIG. 5 is a perspective exploded view of a conventional transmission shaft.

Please refer to FIGS. 1 to 4. The coarse blank 5 of the aluminum transmission shaft of the present invention as shown in FIG. 4 is made with a mold set by continuous forging. The mold set includes an upper mold section 11 and a lower mold section 12 which are mated to form a mold 1. The mating sides of the two mold sections are symmetrically formed with a mold cavity 13. An inner end of the mold cavity 13 has a pivot head molding section 131 with a profile corresponding to a pivot head 51 of one end of the transmission shaft. The mold cavity 13 further has a straight tunnel 132 adjacent to the pivot head molding section 131. The cross-section of the straight tunnel 132 corresponds to the cross-section of the middle shaft rod 52 of the transmission shaft. The straight tunnel has a length shorter than the middle shaft rod of the transmission shaft. An outer end of the straight tunnel 132 is a molding hole 133 coaxially extending from the straight tunnel 132. The cross-section of the molding hole corresponds to the profile of the outer circumference of the pivot head 53 of the other end of the transmission shaft.

The mold set further includes a first punch head 2. One end of the first punch head 2 has a punch rod 21 with a smaller diameter. An end section 211 of the punch rod is conic, while the other end of the punch rod is adjacent to a pivot head molding section 22. The pivot head molding section 22 is adjacent to a cylindrical section 23 adapted to the molding hole. One side of the pivot head molding section 22 adjacent to the punch rod has a molding configuration 221 corresponding to the profile of the pivot head 53 of the end of the transmission shaft. Accordingly, the punch rod has a sufficient length for extending the front end of the punch rod into a position of a neck section 134 adjoining the straight tunnel 132 with the molding hole 133.

The mold set further includes an extension mold 3 having an extension hole 31 as an elongated section of the molding hole.

The mold set further includes a second punch head 4 which is a straight elongated rod with a diameter equal to the diameter of the punch rod 21. An end section 41 of the second punch head 4 is conic.

The method for forging/molding the coarse blank of the aluminum transmission shaft of the present invention includes steps of:

(a) placing burn-in softened aluminum material into the preheated mold 1;
(b) using the first punch head 2 to first forge the aluminum material in the mold cavity 13 from outer side of the molding hole 133 as shown in FIG. 2 so as to form a blank body 50 of the transmission shaft with two pivot heads at two ends and a shorter middle shaft rod;
(c) moving out the first punch head and connecting the extension mold with the mold as shown in FIG. 3;

(d) immediately using the second punch head 4 to secondarily forge the blank body 50 in the mold cavity 13 from outer side of the extension hole and making the end section of the second punch head extend into the mold cavity to a position near the inner end of the mold cavity, whereby the aluminum material of middle section of the blank body is squeezed by the second punch head to outward extend along the axis of the shaft rod and the diameter of the straight tunnel 132 into a predetermined length, the pivot head 53 of the blank body 50 being also outward pushed by the extending middle section of the blank body so as to form the transmission shaft.

According to the above arrangement, the aluminum transmission shaft can be continuously forged by means of the same forging equipment. Therefore, the manufacturing efficiency is enhanced. Also, the middle shaft rod can be simultaneously molded with a hollow. This saves the material and the successive processing time.

The above embodiment is only used to illustrate the present invention, not intended to limit the scope thereof. Many modifications of the above embodiment can be made without departing from the spirit of the present invention.

What is claimed is:

1. A method for forging/molding a coarse blank of an aluminum transmission shaft, comprising steps of:
   (a) placing burn-in softened aluminum material into a preheated mold having a mold cavity, the inner end of the mold cavity having a pivot head molding section with a profile corresponding to the pivot head of one end of a transmission shaft, the mold cavity further having a straight tunnel adjacent to the pivot head molding section of inner end of the mold cavity, the cross-section of the straight tunnel corresponding to the cross-section of the middle shaft rod of the transmission shaft, the straight tunnel having a length shorter than the middle shaft rod of the transmission shaft, an outer end of the straight tunnel being a molding hole coaxially extending from the straight tunnel, the cross-section of the molding hole corresponding to the profile of the pivot head of the other end of the transmission shaft;
   (b) using a first punch head to first forge the aluminum material in the mold cavity from an outer side of the molding hole so as to form a blank body of the transmission shaft with two pivot heads wherein one pivot head is located at each end of the transmission shaft and a shorter middle shaft rod, one end of the first punch head having a punch rod with a smaller diameter, a pivot head molding section being adjacent to the punch rod, one side of the pivot head molding section adjacent to the punch rod having a molding configuration corresponding to the profile of the pivot head of the end of the transmission shaft;
   (c) moving out the first punch head and connecting an extension mold with the pre-heated mold, the extension mold having an extension hole as an elongated section of the molding hole; and
   (d) immediately using a second punch head to secondarily forge the blank body in the mold cavity from an outer side of the extension hole so as to make the middle shaft rod of the blank body outward axially extend into a predetermined length to form the transmission shaft, the second punch head being a straight elongated rod with a diameter equal to the diameter of the punch rod, an end section of the second punch head extending into the mold cavity to a position near the inner end of the mold cavity.

2. The method for forging/molding the coarse blank of the aluminum transmission shaft as claimed in claim 1, wherein in step (a), the mold is composed of an upper mold section and a lower mold section which are mated to form the mold, the mold cavity being symmetrically formed on the mating sides of the two mold sections about the axis of the straight tunnel.

3. The method for forging/molding the coarse blank of the aluminum transmission shaft as claimed in claim 1, wherein in step (b), an punch rod has a sufficient length for extending a front end of the punch rod into a position of a neck section adjoining the straight tunnel with the molding hole.

4. The method for forging/molding the coarse blank of the aluminum transmission shaft as claimed in claim 1, wherein an end section of the punch rod and the end section of the second punch head are conic.

* * * * *